US005309152A

United States Patent [19]

Krucoff

[11] Patent Number: 5,309,152

[45] Date of Patent: May 3, 1994

[54] SECURITY SYSTEM WITH MEMBRANE SWITCHES TO DETECT BINARY CODE ON MECHANICAL KEY

[76] Inventor: Darwin Krucoff, 2820-B Alta View Dr., San Diego, Calif. 92139

[21] Appl. No.: 670,731

[22] Filed: Mar. 18, 1991

[51] Int. Cl.[5] ........................ H04Q 1/00

[52] U.S. Cl. ........................ 340/825.31; 340/426; 70/277

[58] Field of Search ........... 340/825.31, 825.3, 825.34, 340/426, 430; 70/278, 277, 237, 416; 235/382, 448, 490; 361/172

[56] References Cited

U.S. PATENT DOCUMENTS

| | | | |
|---|---|---|---|
| 3,500,326 | 3/1970 | Benford | 340/825.31 |
| 3,631,301 | 12/1971 | Goldman | 340/825.31 |
| 4,123,745 | 10/1978 | Gurgone | 340/430 |
| 4,132,487 | 1/1979 | Fisher | 341/33 |
| 4,315,247 | 2/1982 | Germanton | 340/825.31 |
| 4,390,758 | 6/1983 | Hendrickson | 70/277 |
| 4,392,133 | 7/1983 | Lundgren | 340/825.31 |

*Primary Examiner*—Donald J. Yusko
*Assistant Examiner*—Edwin C. Holloway, III
*Attorney, Agent, or Firm*—Charles C. Logan, II

[57] ABSTRACT

The Code Key is substantially the same size and shape as a conventional key with cuts and slopes that actuate pin tumblers as in a conventional lock. However, instead of the tumblers being aligned by the key to permit mechanical rotation of the lock cylinder, the tumblers close selected sealed switches to create an electrical digital code. This code is compared to a preset code and upon matching of the two codes electrical unlocking and circuit enabling takes place. The unit into which the Code Key is inserted has the approximate shape, and outwardly appears the same, as a conventional lock. This unit, which can be referred to as a translator, has no mechanical connection to the door latch or circuit controls and thus no mechanical actions by an intruder can open the door or otherwise defeat the system. The Code Key Security System (CKSS) provides much more effective entry control for automobiles and other vehicles due to the absence of all mechanical locks and linkages, and includes all necessary controls for a total security system. In addition to vehicles, there are many other applications that can benefit from the added security of replacing mechanical locks and keys with translators and Code Keys. Further, the CKSS can be readily programmed for any desired code, and multiple codes and special functions can be provided.

1 Claim, 2 Drawing Sheets

FIG. 1
FIG. 4
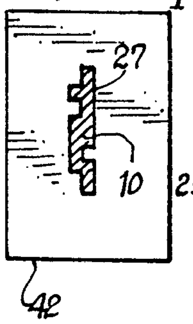
FIG. 2
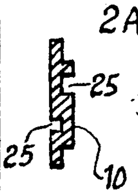
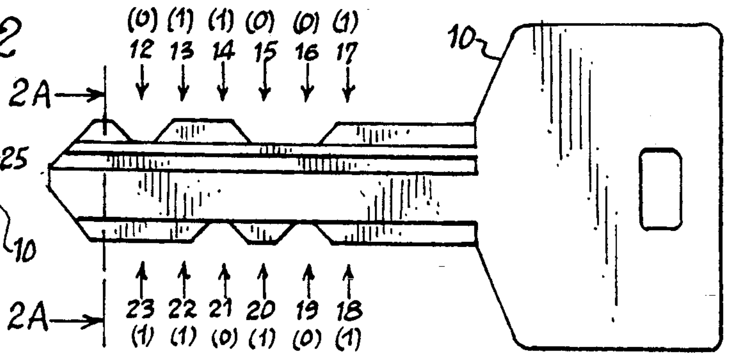
FIG. 5
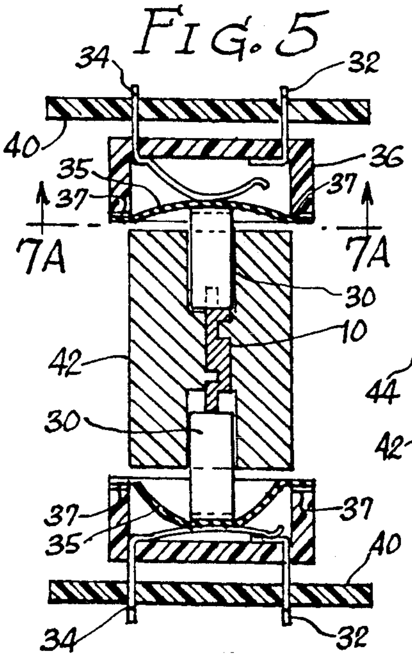
FIG. 3
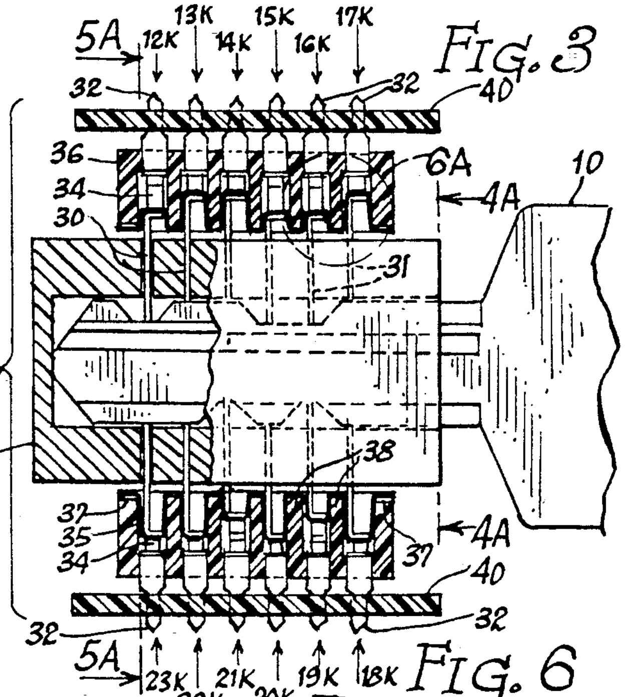
FIG. 7
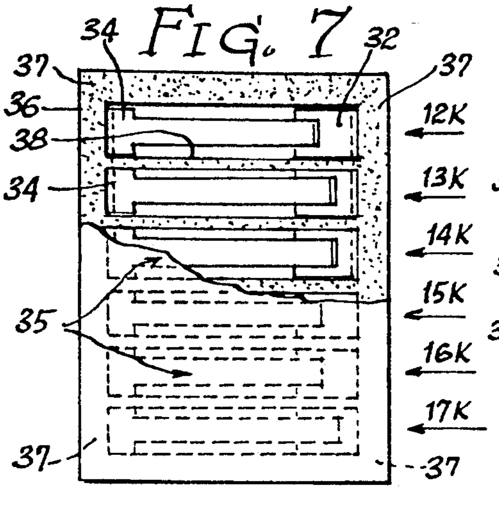
FIG. 6
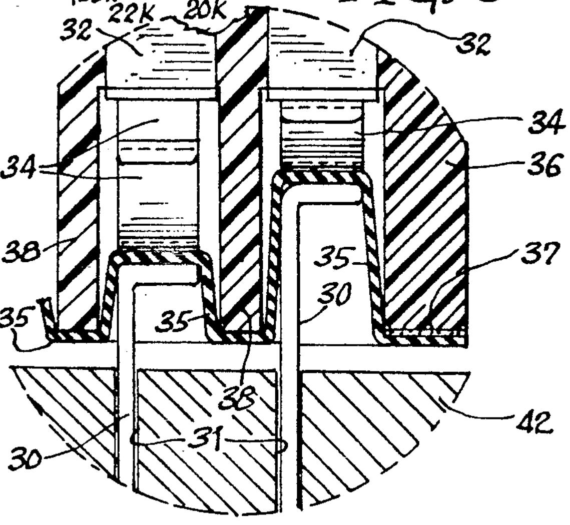

SECURITY SYSTEM WITH MEMBRANE SWITCHES TO DETECT BINARY CODE ON MECHANICAL KEY

BACKGROUND OF THE INVENTION

The present invention relates to the field of physical security systems as conventionally provided by locks and keys, and more particularly to a system in which said locks and keys are replaced by translators and Code Keys together with digital comparator and output circuits to constitute an overall security system.

A particular application of the Code Key Security System (CKSS) relates to automobiles and other vehicles. Many security or theft deterrence systems have been devised for use on vehicles, but most consist of some type of alarm and a means for triggering the alarm. These provide a degree of deterrence but do nothing to prevent entry. They are also frequently prone to false alarms as many of the sensors are motion or vibration sensitive. Some of the systems also disable the ignition circuit, but this can usually be bypassed as is commonly done. There are also remote control systems which lock and unlock the vehicle doors and trunk by means of a small transmitter. Some cars also have a series of push buttons near the outside door handle which can be used to enter a code that will unlock the doors. Although many anti-theft systems have been developed, all cars still utilize a mechanical lock and key system along with any anti-theft system they may have, and thus there is little deterrence to intruder entry of the vehicle.

Over the years there have been many remarkable improvements in automotive technology, yet the locks and keys are essentially the same as those first introduced many years ago. The locks can not only be picked, but can be forced with relatively crude tools, and further there is usually some mechanical means inside on the door which can be reached with a tool under the glass, or by breaking the glass, which will open the door. None of these is possible with the CKSS.

The CKSS has numerous other applications where increased security is desired, such as hotel room or other business or institutional door control. In high traffic areas like hotels, it is frequently desirable to change room keys and this requires rekeying the locks, a time consuming task. The equivalent task for the CKSS, changing the translator code, can be readily accomplished since all of the translators in the facility can be programmed from a central computer terminal. In order to gain some of the advantages of the CKSS, some hotels are using card access control systems for their room doors. The associated card readers for these systems, however, are much larger than a translator and thus have problems regarding placement and aesthetics. Also, these systems are not as versatile as the CKSS since they do not offer the ease and convenience of making and using keys.

SUMMARY OF THE INVENTION

An object of the present invention is to provide a system that markedly improves the deterrence to intruder entry for vehicles such as automobiles, and areas such as hotel rooms, and that has additional security controls. For vehicles, the additional controls include means for locking not only the doors but also the ignition, trunk, hood, and all interior controls.

This is accomplished by replacing all conventional keys and locks with Code Keys and translators, plus logic circuits that recognize the code cut into the Code Key and actuate the desired functions. The translator translates the key code into its equivalent electrical digital code by the use of key actuated pin tumblers that close selected switches through a membrane seal. The key need only be inserted into the translator for recognition to take place, and does not need to be used again in the vehicle interior.

BRIEF DESCRIPTION OF THE DRAWINGS

FIG. 1 is a plan view of a Code Key showing the code positions and the binary digital code formed by the illustrated cuts and connecting slopes.

FIG. 2 shows a cross section view of the Code Key along the plane 2A—2A of FIG. 1.

FIG. 3 shows a partially sectioned side view of a translator with the Code Key inserted and the resulting displacement of the pin tumblers and associated switches.

FIG. 4 shows a front view of the translator with Code Key inserted along the plane 4A—4A of FIG. 3.

FIG. 5 is a verticle transverse section view along the plane 5A—5A of FIG. 3.

FIG. 6 is an enlarged view of zone 6A of FIG. 3 showing the relative positions of the pin tumblers, membrane seal, and switch contacts for code positions of zero and one.

FIG. 7 shows a bottom plan view of the upper set of switches of FIG. 3 along the plane 7A—7A of FIG. 5 with a partially broken away membrane seal.

DESCRIPTION OF THE ILLUSTRATED EMBODIMENTS

Figure 8:
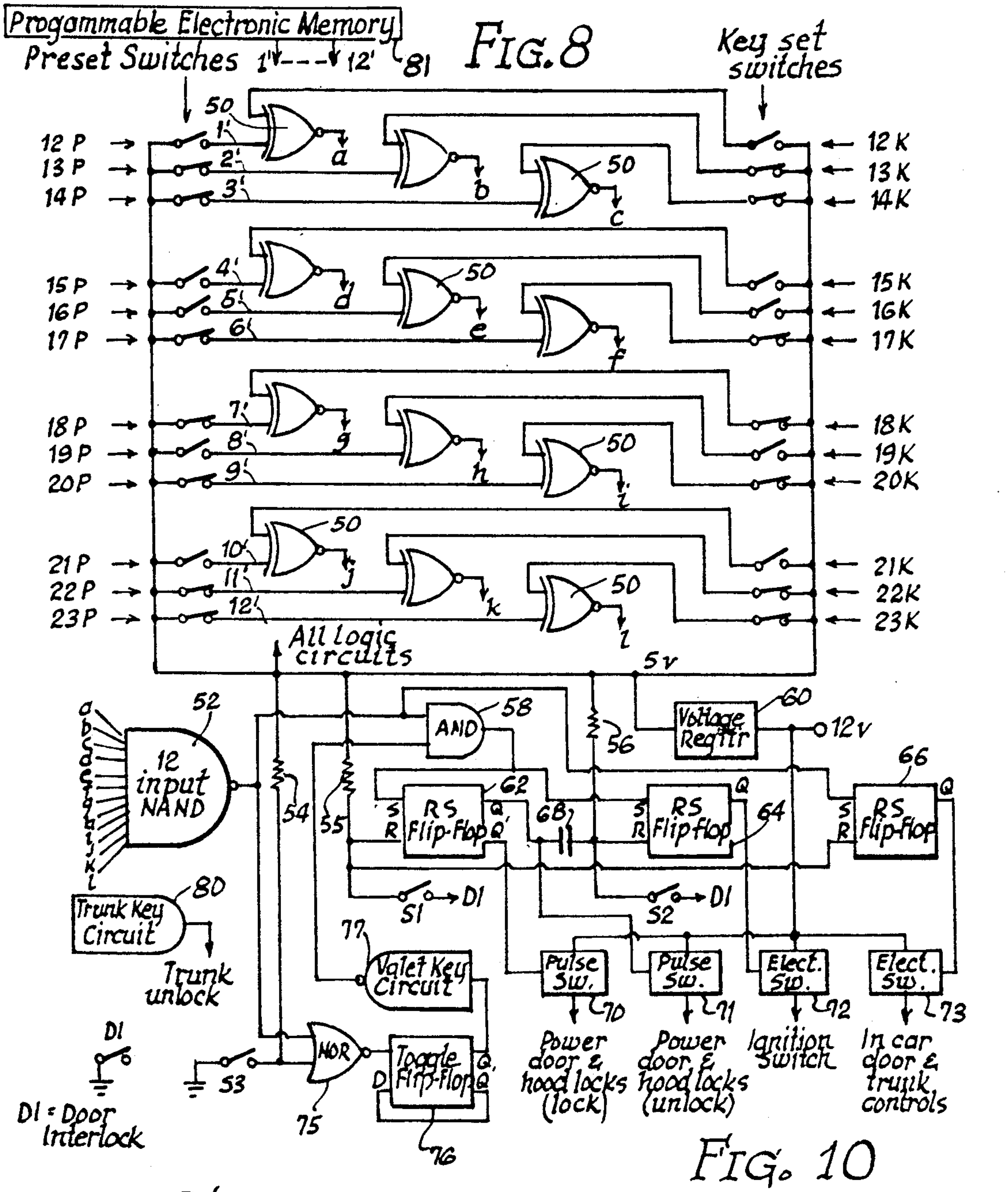
FIG. 8 is a logic/schematic/block diagram of a code recognition circuit and the associated control circuits for a complete automobile security system.

Code Key 10, shown in FIG. 1, is seen to have very nearly the same appearance, and is of the same size as a conventional key. It is also made in the same way as a conventional key, by the use of cuts and connecting slopes at selected positions on its edges. Grooves 25, shown in FIG. 2, can also be used in the center portion of 10 in various patterns, as with ordinary keys, to identify individual families of keys. There are differences, however, both in form and use between Code Key 10 and conventional keys. The cuts of Code Key 10 are all of the same depth, rather than the multiple depth cuts of other keys, and serve a different purpose. Each of the cut-code positions, 12-23, represents a bit of a binary digital code, with a cut equating to a binary zero and the absence of a cut at a code position equating to a binary one. The binary code formed by the cuts illustrated in FIG. 1 is shown adjacent to the 12-23 code positions. Each of the twelve 12-23 code positions can be independently cut-programmed to yield 4,096 different codes. More or fewer code positions may be used to suit particular applications.

Code Key 10 is also used in a different manner from that of other keys. To accomplish the desired unlocking and enabling functions, it is only necessary to insert Code Key 10 into the mating channel 27 (FIG. 4) of a translator 44 (FIG. 3), it is not turned. The stationary structure 42 contains mating channel 27 and pin tumbler channels 31. Insertion of Code Key 10 causes some of the pin tumblers 30 to close selected sealed switches 13K, 14K, 17K, 18K, 20K, 22K, and 23K in FIG. 3 that correspond to the binary ones of the digital code cut into the illustrated Code Key 10. The pin tumblers are raised and lowered as the Code Key is inserted just as conventional pin tumblers in a lock cylinder, with full insertion, as shown in FIG. 3, translating the mechanical code of 10 into its electrical equivalent. Pin tumblers 30 act through a membrane seal 35 to depress movable switch contacts 34 onto stationary switch contacts 32, thereby closing the desired switches that output a voltage representing a binary one. Construction of the switches is further illustrated in FIG. 5, which shows switches 12K and 23K in a sectional view along plane 5A—5A of FIG. 3, FIG. 6 showing an enlarged view of zone 6A of FIG. 3, and FIG. 7 showing a plan view of a set of switches along the plane 7A—7A of FIG. 5. The membrane seal 35 protects the switch contacts from outside contamination and may be formed from an elastic or otherwise deformable membrane. Membrane seal 35 is sealed to the switch body 36 completely around the periphery of 36 as indicated by fixed seal 37. Individual switches are separated from each other by interior switch partitions 38. A switch set such as 12K–17K is of similar design to commercially available DIP switches that have 0.1 inch spacing between individual switches, thus requiring only approximately 0.6 inch of key length for twelve code positions. Switch contacts 32 are inserted into a printed circuit board 40 for connection to the remainder of the circuit.

Figure 9:
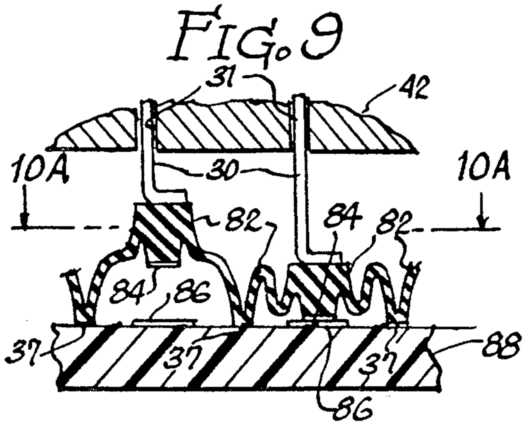
FIG. 9 is an enlarged side view of a second type of sealed membrane switch.
Figure 10:
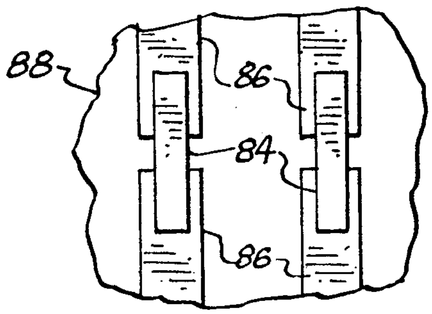
FIG. 10 is a plan view of a section of a printed circuit board along the plane 10A—10A of FIG. 9 showing the layout of fixed and movable contacts.

Other membrane type sealed switches may also be used and another design that has had wide commercial application is shown in FIGS. 9 and 10. FIG. 9 shows an enlarged side view of two switches of a multiple set of switches; one switch is shown in the open position and the other in the closed position. A continuous rubber membrane 82 covers all of the switches of a set and is sealed to a printed circuit board 88 between each switch as shown by 37, and also around the periphery of 82. Membrane 82 is preformed for all switches in the form shown for the open switch position. Movable switch contacts 84 are formed on or affixed to membrane 82, and positioned directly opposed to fixed contacts 86, which are formed as part of a printed circuit on circuit board 88. As previously described, the insertion of Code Key 10 into mating structure 42 causes selected pin tumblers 30 to be extended, and these depress membrane 82 at the selected switch positions and bring the movable contacts and fixed contacts together to close the selected switches. A plan view of the switch contacts along the plane 10A—10A of FIG. 9 is shown in FIG. 10. Fixed contacts 86 constitute an opposed pair separated by a gap for each switch of the set. Movable contact 84 bridges the gap when the membrane for the selected switch is depressed, which closes the switch.

Turning now to the logic and other circuits that complete the CKSS, FIG. 8 shows these with special application to a complete automobile security system. First the basic system will be described and then the additional special features of FIG. 8 that apply to automobiles. The key set switches 12K–23K are the switches in translator 44, with the illustrated ON and OFF positions corresponding to the code shown on Code Key 10 in FIGS. 1 and 3. Each of the outputs of switches 12K–23K is connected to one input of an Exclusive-NOR gate 50. Each of the other inputs to the Exclusive-NOR gates 50 is preset to an electrical representation of the ones and zeros that correspond to the code cut into Code Key 10. The preset code may be obtained from manually set switches 12P–23P or a programmable electronic memory 81. The Exclusive-NOR gates 50 output a high logic level signal when and only when the two inputs of 50 are at the same logic level, either high or low. All of the outputs of gates 50 are inputs to a NAND gate 52 whose output drops to a low logic level when all of its inputs are high, indicating a match between the preset code and the code of Code Key 10.

The said gates 50 and 52, RS flip-flop 62, switch S1, and pulse switches 70 and 71, together with translator 44, Code Key 10 and a means for generating the preset code comprise the basic system that provides a locking-unlocking function for doors or other applications where conventional locks or card control systems are used. For the basic system the output of 52 is connected directly to the S input of an RS type flip-flop 62. When the 52 output goes low the Q output of 62 goes high and pulse switch 71 outputs a pulse of sufficient power and duration to energize an electromechanical unlocking means. Operation of switch S1, which may be mounted on the inside of a door, and is operational only when the door is open through interlock switch DI, will cause the R input of 62 to go low, the Q' output of 62 to go high, and a locking pulse to be delivered by pulse switch 70. In the absence of a S1 switch closure the R input of 62 is held high by resistor 55. If it is desired that Code Key 10 be used for both locking and unlocking, a toggle flip-flop such as 76 is substituted for 62 with the Q and Q' outputs alternating their logic levels, and thus the locking or unlocking pulses from 70 or 71, for each key insertion. Power for the logic circuits typically requires a five volt power supply which is readily available commercially at low cost. For automobiles this can be obtained by a voltage regulator 60 connected to the twelve volt supply of the vehicle.

For automobile systems a translator 44 is mounted in each front door and the trunk and outwardly appears the same as a conventional lock. Associated with each translator is a set of Exclusive-NOR gates 50, a means for generating the preset code, and NAND gate 52. As previously indicated, upon Code Key 10 insertion and a resulting match between the key set switches and the preset code, the output of 52 drops to a low logic level. This causes the output of AND gate 58 to go low, driving the S inputs of RS flip-flops 62 and 64 low, the Q outputs of 62 and 64 go high, and pulse switch 71 unlocks the doors and hood and electronic or electromechanical switch 72 energizes the ignition switch. The low 52 output also causes the Q output of RS flip-flop 66 to go high, which turns on electronic or electromechanical switch 73 that energizes the in car door and trunk controls to permit individual door locking or unlocking or trunk unlocking. As in the basic system, operation of switch S1, mounted on the inside of each front door and interlocked through switch DI, will reverse the logic status of RS flip-flop 62, and now also 64 and 66, to lock all doors and the hood, and also to deenergize the ignition switch and the in car door and trunk controls. This is accomplished by S1 directly driving the R inputs of 62 and 66 low, from the otherwise high level established by resistor 55, and also the R input of 64 through capacitor 68, otherwise held high by resistor 56. When the R inputs go low the Q outputs go low, which provides no input to 71 and turns off 72 and 73, and the Q' output of 62 goes high to turn on 70.

It will be noted that no translator is required in the vehicle since all of the unlocking and energizing functions are accomplished by the insertion of Code Key 10 into an outside translator. This eliminates the need to perform two unlocking functions, first the door and then the ignition, and then leave the key in the ignition lock, as currently practiced. Such practice not only requires additional time and effort, but is the major cause of keys being left in locked cars. Occasionally it may be desirable to have the doors unlocked but the ignition switch deenergized, i.e., locked. This is the purpose of S2, also on the inside of each front door and interlocked through DI. Closing switch S2 causes the R input, and thus the Q output, of 64 to go low, which turns off switch 72. To turn the ignition on again requires another insertion of Code Key 10 into an outside translator.

To prevent the copying or noting of the code of Code Key 10 when it is necessary to give a key to an attendant for valet parking, or for repair or maintenance, there is a second, or valet key, with a different code. The valet key is not operational until this function is turned on by the master key. To accomplish this the master key is inserted in a translator and while inserted switch S3 is operated. Switch S3 may also be on the inside of a door but does not need to be interlocked through switch DI since the operation of S3 alone will not make the valet key operational. Switch DI is closed only when the door is open, which prevents any inadvertent action due to operation of switches S1 or S2 when the vehicle is being operated and the door is closed. When the master key is inserted in a translator, the output of NAND gate 52, and thus one input of NOR gate 75, go low. The other input of 75, normally high due to resistor 54, is driven low by the operation of switch S3. Both inputs of NOR gate 75 going low causes the output of 75 to go high. This causes toggle flip-flop 76 to reverse the logic status of its Q output and energize valet key circuit 77. A second application of the master key and S3 will again reverse the Q logic status of 76 and deenergize valet key circuit 77. Valet key circuit 77 consists of a second means for generating a preset code, and a second set of gates 50 and 52. The valet key preset code is matched to the code of the valet key and different from that of the master key. Insertion of a valet key into a translator on a door that contains valet key circuit 77, when said circuit 77 is energized, will drive one input of AND gate 58 low, causing RS flip-flops 62 and 64 to operate switches 71 and 72, which unlocks the doors and hood and energizes the ignition switch. The valet key, however, will not operate RS flip-flop 66 and so does not provide access to the trunk.

Trunk key circuit 80 consists of a means for generating the preset code of the master key, and associated gates 50 and 52. The insertion of the master key into a translator mounted on or near the trunk lid causes trunk unlocking. Closing the trunk lid operates a switch that provides trunk locking.

The embodiments shown are given as illustration only, to further the understanding of the invention, and are not to be construed as limiting the scope of the invention. It is intended in the claims to cover all variations and modifications which come within the true spirit and scope of the invention.

What is claimed is:

1. Security system for access control of vehicle doors, chamber doors, and enclosed areas, and further providing vehicle ignition circuit control and in car door and trunk control, said system comprising:

(a) a key the same in all respects as a conventional key with the exception that all cuts are of the same depth and all connecting slopes are alike, wherein said cuts are on both serrated edges and represent binary bits of a digital code;

(b) a mating structure configured to receive said key, said structure containing tumblers actuated by the insertion of said key;

(c) switches mounted adjacent to and operated by said tumblers through a deformable elastic membrane seal, said switches providing a pattern of ON and OFF positions which translate the said key code into its electrical equivalent;

(d) digital logic circuits which recognize said digital code by comparison with a preset code and output a control signal upon said recognition, said preset code formed by a set of mechanical switches or a programmable electronic memory;

(e) additional logic and output circuits responsive to said output control signal that provide electrical locking, unlocking, vehicle ignition circuit control and in car door and trunk control;

(f) said membrane seal which serves to totally enclose the contacts of said switches for protection against outside contamination;

(g) each of said switches adjacent to said tumblers operably connected to the first input of a first digital logic circuit, with a second input of said first digital logic circuit connected to a logic one or zero as determined by said preset code, and with an output of said first digital logic circuit when the two inputs are the same;

(h) a second digital logic circuit having inputs that are all of the outputs of the said first digital logic circuit, said second digital logic circuit providing a summation of the said inputs and producing an output that indicates said key recognition when all of the code positions of the said key match the corresponding binary code bits of the said preset code;

(i) a master key, capable of unlocking and enabling of the ignition circuit and in car door and trunk controls, cut to one binary code, which can alternately enable and disable a second key, referred to as a valet key, said valet key cut to a different binary code, and capable of unlocking and ignition circuit control only;

(j) a said first digital logic circuit with preset code matched to said master key and a said second digital logic circuit;

(k) a said first digital logic circuit with present code matched to said valet key and a said second digital logic circuit;

(l) a switch used simultaneously with insertion of said master key to cause the alternate enabling and disabling of said valet key;

(m) a NOR digital logic circuit inputting the output of said second digital logic circuit of said master key and said switch and outputting a signal, when both inputs are present, to a toggle flip-flop circuit which alternately turns ON and OFF the digital logic circuits of the said valet key; and (n) an AND digital logic circuit inputting the output of either said second digital logic circuit of said valet key or said second digital logic circuit of said master key and outputting a signal to flip-flop circuits that cause unlocking and ignition circuit enabling for either the said master key or the said valet key, but only the said master key has a bypass of said AND circuit that enables the in car door and trunk controls.

* * * * *